(12) United States Patent
Anglin et al.

(10) Patent No.: US 8,194,840 B2
(45) Date of Patent: Jun. 5, 2012

(54) TELECONFERENCE SUBSCRIPTION CONTROL FOR AGENDA SUBSCRIPTION TOOLS

(75) Inventors: Debbie A. Anglin, Austin, TX (US);
Howard H. Anglin, Austin, TX (US);
Nyralin N. Kline, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1038 days.

(21) Appl. No.: 12/131,732

(22) Filed: Jun. 2, 2008

(65) Prior Publication Data
US 2009/0296909 A1 Dec. 3, 2009

(51) Int. Cl.
*H04M 3/42* (2006.01)
(52) U.S. Cl. ................................. 379/202.01
(58) Field of Classification Search .................. 370/260; 379/202.01; 705/7.14, 7.16; 709/223, 224
See application file for complete search history.

(56) References Cited

U.S. PATENT DOCUMENTS

| 6,839,417 | B2 | 1/2005 | Weisman et al. |
| 2005/0131714 | A1* | 6/2005 | Braunstein et al. ............... 705/1 |
| 2007/0016661 | A1* | 1/2007 | Malik .......................... 709/223 |
| 2007/0150583 | A1* | 6/2007 | Asthana et al. ............... 709/224 |

* cited by examiner

*Primary Examiner* — Ahmad Matar
*Assistant Examiner* — Sonia Gay
(74) *Attorney, Agent, or Firm* — Yudell Isidore Ng Russell PLLC

(57) ABSTRACT

A method, system, and computer program product for autonomously controlling caller access to a teleconference based on specified preferences of a moderator. Using preferences established by the moderator of a teleconference, a conference control system may grant or restrict access of participants of the teleconference. The conference control system may authorize callers of a teleconference based on the current agenda item being discussed or the amount of time a caller has been on the ongoing teleconference. When a specific caller is not authorized to be on a conversation, the conference control system may mute the conversation for a specific caller, or disconnect the caller. The conference control system may autonomously re-connect the caller when an authorized agenda item for the caller is being discussed.

15 Claims, 3 Drawing Sheets

TELECONFERENCE SUBSCRIPTION CONTROL FOR AGENDA SUBSCRIPTION TOOLS

BACKGROUND OF THE INVENTION

1. Technical Field

The present invention relates in general to teleconference management utilities. Still more particularly, the present invention relates to using a data processing system for managing participation by members of a teleconference.

2. Description of the Related Art

Currently, there are controls limiting how long a teleconference may be able to run. However, there is currently no method for granting or restricting access to a teleconference by a user based on the topic currently being discussed. Additionally, there are currently no tools for limiting access to a teleconference based on an allotted amount of time established by a moderator.

SUMMARY OF THE INVENTION

A method, system, and computer program product for autonomously controlling caller access to a teleconference based on specified preferences of a moderator. Using preferences established by the moderator of a teleconference, a conference control system may grant or restrict access of participants of the teleconference. The conference control system may authorize callers of a teleconference based on the current agenda item being discussed or the amount of time a caller has been on the ongoing teleconference. When a specific caller is not authorized to be on a conversation, the conference control system may mute the conversation for a specific caller, or disconnect the caller. The conference control system may autonomously re-connect the caller when an authorized agenda item for the caller is being discussed.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, will best be understood by reference to the following detailed descriptions of an illustrative embodiment when read in conjunction with the accompanying drawings, wherein:

DETAILED DESCRIPTION OF THE PREFERRED EMBODIMENT

The illustrative embodiments provide a method, system, and computer program product for autonomously controlling caller access to a teleconference based on specified preferences of a moderator.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
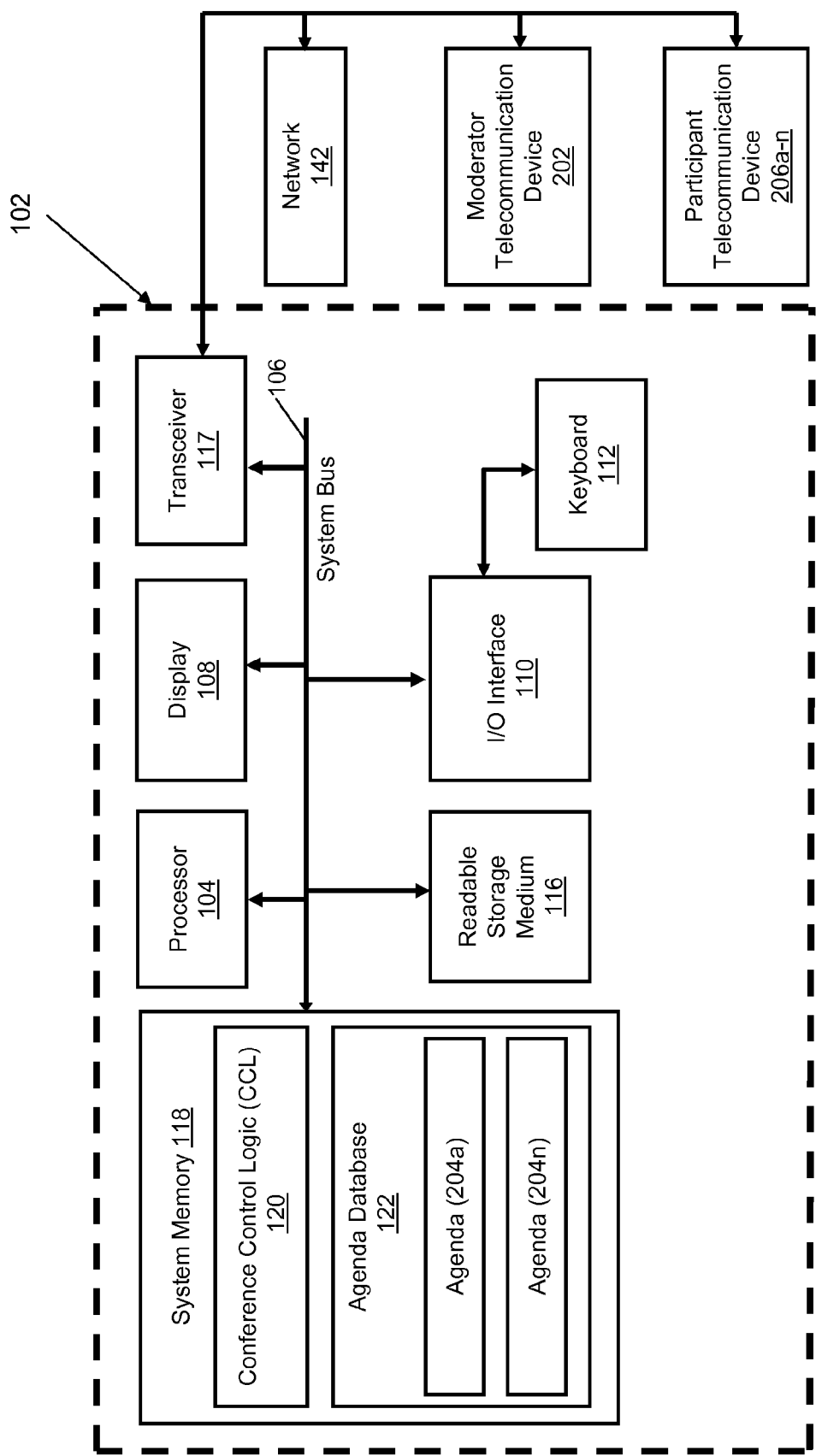
FIG. 1 is a block diagram of a process server in which the present invention may be implemented.

With reference now to FIG. 1, there is depicted a block diagram of a conference control system 102 in which the present invention may be implemented. Conference control system (CCS) 102 includes a processor 104 that is coupled to a system bus 106. A network interface 117, connected to system bus 106, enables CCS 102 to connect to a moderator telecommunication device (MTD) 202, participant telecommunication devices (PTDs) 206*a-n*, and network 142 via wired or wireless technology. Input/Output (I/O) Interface 110, also connected to system bus 106, permits user interaction with CCS 102, such as data entry via keyboard 112. Display 108, coupled to system bus 106, allows for presentation of a general user interface (including text and graphics) for use by a user of process server 102. System bus 106 also affords communication with a readable storage medium 116 (e.g., Compact Disk—Read Only Memory (CD-ROM), flash drive memory, etc).

CCS 102 also comprises system memory 118, which is connected to system bus 106. System memory 118 of CCS 102 includes conference control logic (CCL) 120. CCL 120 includes code for implementing the processes described in FIGS. 2-3. In one embodiment, CCS 102 is able to utilize CCL 120 to manage individual caller access to a teleconference as described in greater detail below in FIGS. 2-3. System memory 118 also includes agenda database 122. Agenda database 122 contains listings and preferences of one or more agendas (e.g., agenda 204*a-n*, FIG. 2) for future teleconferences.

As illustrated and described herein, CCS 102 may be a computer system of server having the required hardware components and programmed with CCL 120, executing on the processor to provide the functionality of the invention. The hardware elements depicted in conference control system 102 are not intended to be exhaustive, but rather are representative to highlight essential components required by and/or utilized to implement the present invention. For instance, CCS 102 may include alternate memory storage devices such as magnetic cassettes, Digital Versatile Disks (DVDs), Bernoulli cartridges, and the like. These and other variations are intended to be within the spirit and scope of the present invention.

Figure 2:
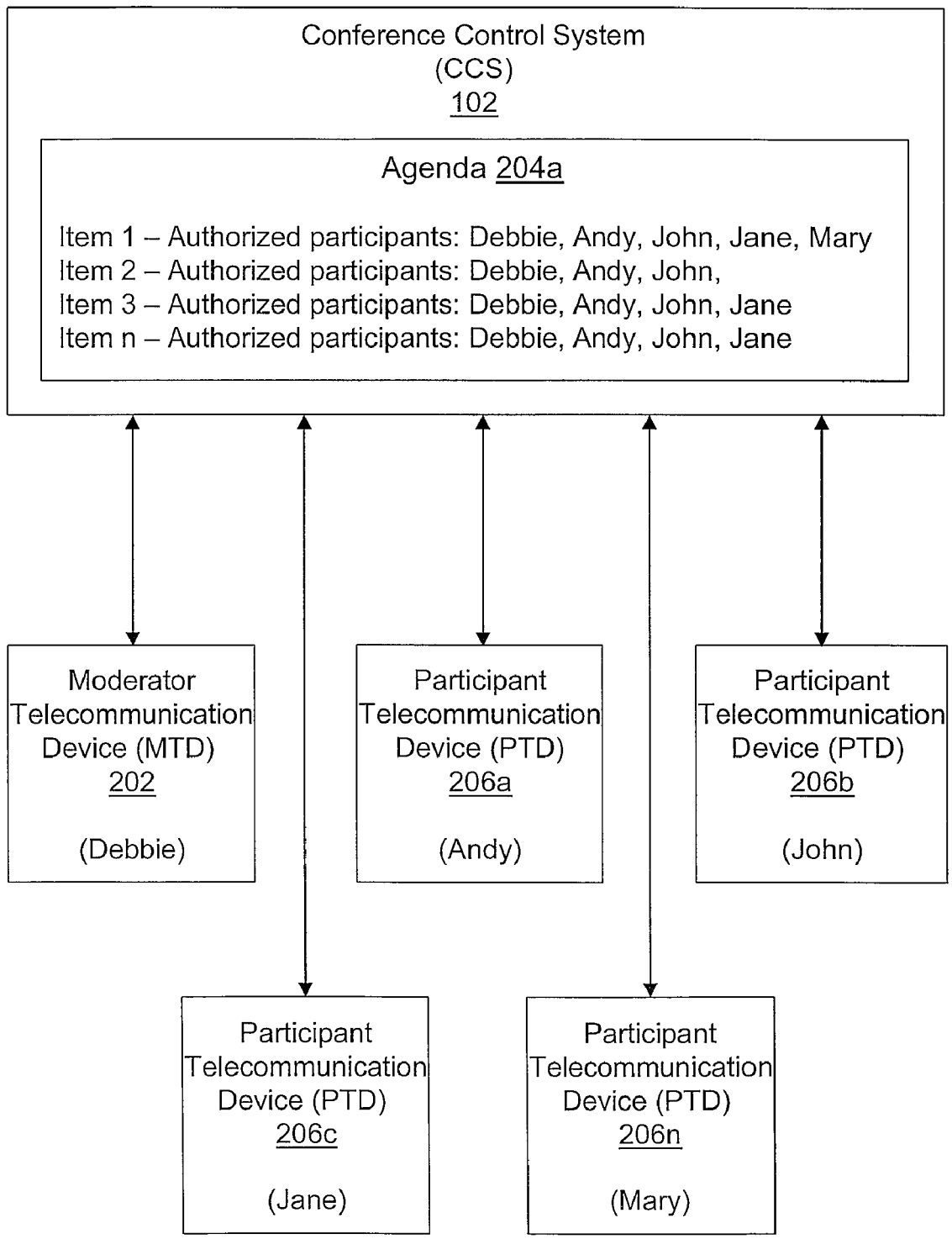
FIG. 2. is a block diagram of an exemplary system for implementing a conference control system to autonomously control caller access to a teleconference based on moderator specified preferences.

With reference now to FIG. 2, there is illustrated an exemplary system for implementing a conference control system (CCS) to autonomously control participant access to a teleconference based on moderator specified preferences. CCS 102 is a system for managing participants of a teleconference. CCS 102 (e.g., CCL 120) provides tools to a moderator of a teleconference for managing participants of a conversation.

Additionally, CCS 102 provides a system for distributing unique conference pass codes for participants of a scheduled teleconference. A moderator, a user of a Moderator Telecommunication Device (MTD) 202, creates an Agenda 204a-n of CCS 102 for a future teleconference. The Agenda 204a-n specifies a date and time and the participants of a teleconference Agenda 204a-n may be transmitted to CCS 102 by MTD 202. Alternatively, CCS 102 may allow data to be entered directly by a moderator through the use of an input device of CCS 102 (e.g., keyboard 112, FIG. 1). Agenda 204a-n also contains a listing of multiple agenda items. Agenda items are scheduled topics of conversation for participants of the teleconference. The moderator may establish preferences for allowed participants for each agenda item of the teleconference. This allows a moderator to control which participants are able to listen or speak in the teleconference while a specific agenda item is being discussed.

When an Agenda 204a-n has been established, CCS 102 may transmit a unique pass code to a Participant Telecommunication Device (PTD) 206a-n for each participant of the teleconference. The pass code may contain information of the teleconference date and time, participants of the teleconference, agenda items of the teleconference, a dial-in number for the teleconference, and a unique numeric code. The unique numeric code may be entered by a PTD 206a-n when the user of the PTD 206a-n connects with the dial-in number for the teleconference at scheduled date and time. The unique numeric code identifies the PTD 206a-n to CCS 102, allowing CCS 102 to apply the desired permissions to user for the duration of the teleconference. It is important to note that MTD 202 and PTDs 206a-n may be a computer or a telecommunication device (e.g., cellular phone, pager, a cellular personal data assistant (PDA), Plain Old Telephone System (POTS) device).

A moderator of a teleconference may also establish participation levels of CCS 102 for participants of a teleconference. A participation level establishes whether a participant using a PTD 206a-n is allowed to speak or listen to agenda items of a teleconference. In an exemplary embodiment, a user of a PTD 206a-n with a "low authority" participation level may only be authorized to participate in two agenda items of a five item agenda 204a-n. While the authorized agenda items are being discussed, the user of a PTD 206a-nn may listen and speak in the teleconference. When the user of a PTD 206a-n is authorized to participate in multiple agenda items that are non-sequential, CCS 102 may terminate the connection of a PTD 206a-n to the teleconference, and re-establish the connection when the next authorized agenda item is to be discussed. Alternatively, when the participant is not authorized to partake in a discussed agenda item CCS 102 may mute the teleconference connection with a PTD 206a-n. A user with a "medium authority" for a teleconference may be able to listen in for all agenda items of a teleconference, but may only be authorized to speak for selected agenda items. A participant with a "high authority" for a teleconference may be able to listen and speak in all agenda items of a teleconference. Additionally, a participant of a teleconference may be disconnected after a specified amount of participation time on a teleconference.

CCS 102 may also permit a user of a MTD 202 to perform in call moderation while a teleconference is happening. CCS 102 may contain a voice prompt menu to allow the user of MTD 202 to enter a sequence of numbers to restrict or authorize speaking or listening ability of participants of a teleconference at will. The moderator may also enter a specific sequence of button presses to disconnect a participant from the teleconference. CCS 102 may advance the agenda items of a teleconference at specified time intervals as established by the moderator, or by receiving a specific sequence of numbers by MTD 202 while the teleconference is taking place.

When the event that not all agenda items are discussed in a teleconference, CCS 102 may autonomously schedule a follow-up teleconference for a future data. CCS 102 may determine which users are authorized to participate in the remaining items of the agenda 204a-n and autonomously transmits a unique follow-up pass code to those PTDs 206a-n. The follow-up teleconference may maintain the same permissions established for the first teleconference, or may be modified at will by the moderator.

Figure 3:
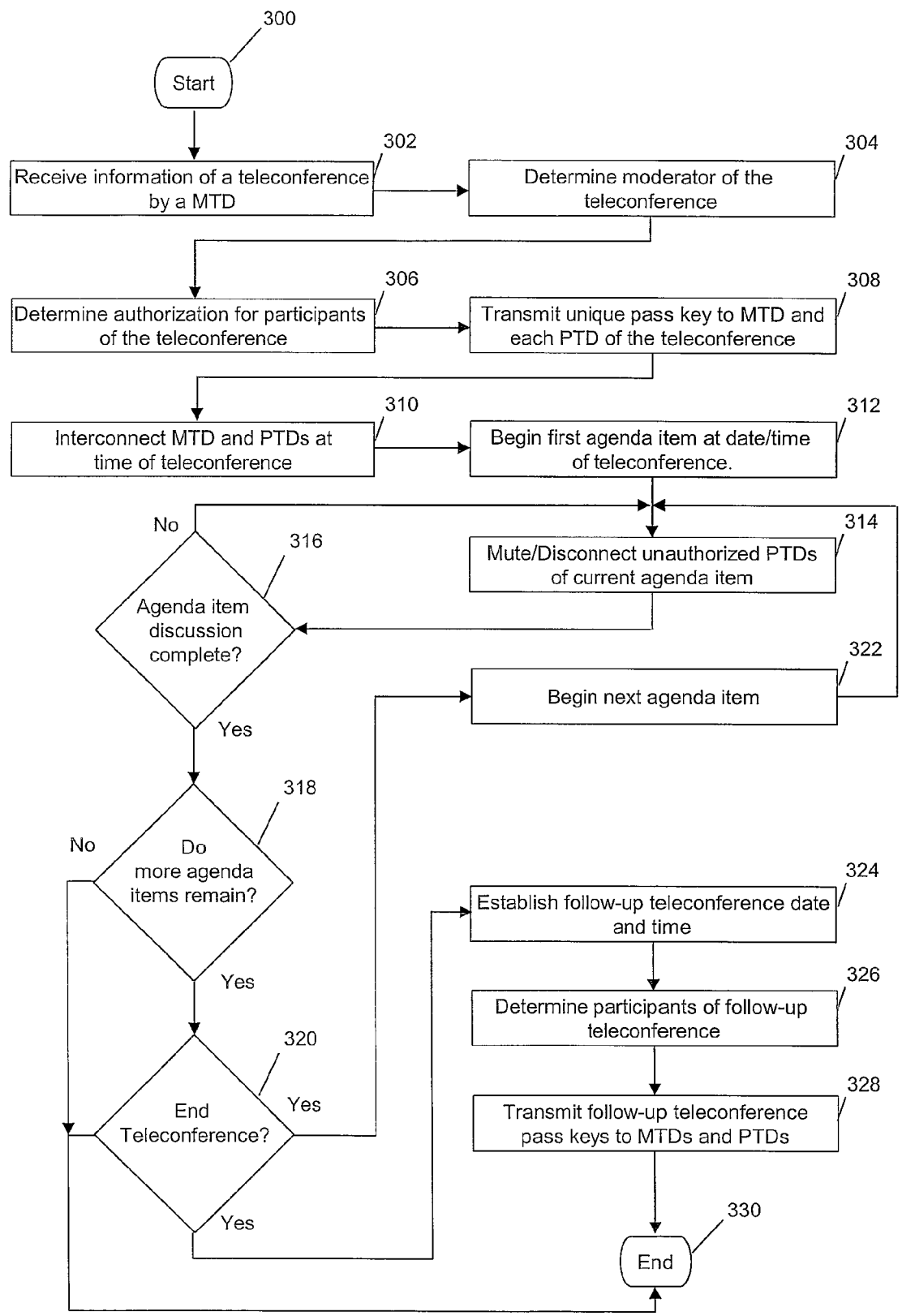
FIG. 3. is a high-level logical flowchart of an exemplary method for using a conference control system to autonomously control caller access to a teleconference based on moderator specified preferences.

With reference now to FIG. 3, a high-level logical flowchart of an exemplary method for conference control system to autonomously control caller access to a teleconference based on moderator specified preferences. After initiator block 300, CCS receives participant, agenda, and date/time information for a future teleconference (block 302). In block 304 CCS determines the moderator of the teleconference. CCS then determines which agenda items each participant is authorized to participate listen and/or speak in (block 306). CCS may then transmit a unique pass key to the MTD and each PTD of the teleconference (block 308). At the time of the teleconference, CCS interconnects the MTD and each PTD (block 310). CCS then begins the first agenda item (block 312). Unauthorized PTDs of the first agenda item are muted or disconnected from the teleconference item as long as the first agenda item is being discussed (block 314).

When the first agenda item discussion is completed, as determined by a time limit, or by the moderators will (block 316), CCS determines if any more agenda items remain for discussion (block 318). When no additional agenda items remain, the process terminates (block 330).

When additional agenda items remain, CCS may then determine if the teleconference should be terminated (as determined by a time limit or by the moderators will; block 320). If it is not desired to terminate the teleconference CCS will begin the next agenda item (block 322), and the process loops in an iterative manner to block 314.

When it is desired for the teleconference to terminate and agenda items still remain to be discussed, CCS will autonomously establish a follow-up teleconference date and time (block 324). CCS then autonomously determines the participants scheduled to partake in the remaining agenda items (block 326). CCS may then autonomously transmit a follow-up teleconference pass key to the MTD and each PTD of each participant scheduled to partake in the follow-up teleconference (block 328). The process then ends at terminator block 330.

In the flow charts above, one or more of the methods are embodied in microcode such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of controlling access by participants of a teleconference to a conference control system, the method comprising:
   receiving a first time at which a teleconference is scheduled to take place;
   receiving a plurality of agenda items of the teleconference;
   receiving a list of participant telecommunication devices participating in the teleconference;
   receiving a selection of a first agenda item of the plurality of agenda items for a participant of the teleconference indicating that first participant telecommunication device of the teleconference is authorized to listen to the teleconference and not contribute while the first agenda item is being discussed;
   determining a maximum time limit for the first agenda item;
   creating a conference pass code for the participant telecommunication device, wherein the conference pass code indicates that the participant is authorized to listen to the teleconference and not contribute while the first agenda item is being discussed;
   transmitting the conference pass code to the participant telecommunication device;
   receiving, from the participant, a connection request comprising the conference pass code;
   in response to receiving the connection request from the participant telecommunication device:
      determining a current agenda item being discussed;
      if the current agenda item being discussed is not the first agenda item, preventing communication exchange with the teleconference for the participant telecommunication device; and
      if the current agenda item being discussed is the first agenda item, connecting the participant telecommunication device to the teleconference and restrict contribution from the participating device.

2. The method of claim 1 further comprising:
   receiving a selection of a third agenda item;
   determining that a second agenda item is being discussed;
   in response to determining that the second agenda item is being discussed, terminating the connection to the teleconference of the participant telecommunication device; and
   in response to later determining that the third agenda item is being discussed, establishing the connection with the teleconference to the participant telecommunication device.

3. The method of claim 1, further comprising:
   receiving a request of a moderator telecommunication device, wherein the request authorizes a selection of participant telecommunication devices that are permitted to exchange communication to the teleconference; and
   in response to receiving the request, muting participant telecommunication device that are not of the selected participant telecommunication devices.

4. The method of claim 1, further comprising:
   in response to the teleconference terminating prior to each agenda item of the plurality of agenda items being discussed, selecting a next time for a follow-up teleconference;
   creating a follow-up pass code for each authorized participant of the plurality of participants authorized to speak on one or more of the remaining agenda items; and
   transmitting the follow-up pass code to each of the authorized participants.

5. The method of claim 1, further comprising:
   in response to determining the maximum time limit for the current agenda item being discussed has expired, preventing communication exchange with the teleconference for the participant telecommunication device.

6. A conference control system comprising:
   a transceiver;
   a processor;
   processing logic that when executed by a processor causes the processor to:
      receive a first time at which a teleconference is scheduled to take place;
      receive a plurality of agenda items of the teleconference;
      receive a list of participant telecommunication devices participating in the teleconference;
      receive a selection of a first agenda item of the plurality of agenda items for a participant of the teleconference indicating that a participant telecommunication device of the teleconference is authorized to listen to the teleconference and not contribute while the first agenda item is being discussed;
      determine a maximum time limit for the first agenda item;
      create a conference pass code for the participant telecommunication device, wherein the conference pass code indicates that the participant is authorized to listen to the teleconference and not contribute while the first agenda item is being discussed;
      transmit the conference pass code to the participant telecommunication device;
      in response to receiving the connection request from the participant telecommunication device:
         determine a current agenda item being discussed;

if the current agenda item being discussed is not the first agenda item, prevent communication exchange with the teleconference for the participant telecommunication device; and if the current agenda item being discussed is the first agenda item, connect the participant telecommunication device to the teleconference and restrict contribution from the participating device.

7. The conference control system of claim 6, the processing logic further causing the processor to:

in response to determining the current agenda item being discussed is not one of the selected agenda items, terminate the connection to the teleconference of the participant telecommunication device; and in response to determining the current agenda item being discussed is one of the selected agenda items while the participant telecommunication device is not on the teleconference, re-establish the connection with the teleconference to the participant telecommunication device.

8. The conference control system of claim 6, the processing logic further causing the processor:

receive a selection of a third agenda item;
determine that a second agenda item is being discussed;
in response to determining that the second agenda item is being discussed terminate the connection to the teleconference of the participant telecommunication device; and
in response to later determining that the third agenda item is being discussed, establish the connection with the teleconference to the participant telecommunication device.

9. The conference control system of claim 6, the processing logic further causing the processor to:

in response to the teleconference terminating prior to each agenda item of the plurality of agenda items being discussed, select a next time for a follow-up teleconference;
create a follow-up pass code for each authorized participant of the plurality of participants authorized to speak on one or more of the remaining agenda items; and
transmit the follow-up pass code to each of the authorized participants.

10. The conference control system of claim 6, the processing logic further causing the processor to:

in response to determining the maximum time limit for the current agenda item being discussed has expired, prevent communication exchange with the teleconference for the participant telecommunication device.

11. A computer program product comprising a computer readable storage medium having a plurality of instructions stored therein, wherein the plurality of instructions, when executed by a processing device, allows a machine to:

receive a first time at which a teleconference is scheduled to take place;
receive a plurality of agenda items of the teleconference;
receive a list of participant telecommunication devices participating in the teleconference;
receive a selection of a first agenda item of the plurality of agenda items for a participant of the teleconference indicating that a participant telecommunication device of the teleconference is authorized to listen to the teleconference and not contribute while the first agenda item is being discussed;

determine a maximum time limit for the first agenda item;
create a conference pass code for the participant telecommunication device wherein the conference pass code indicates that the participant is authorized to listen to the teleconference and not contribute while the first agenda item is being discussed;
transmit the conference pass code to the participant telecommunication device;
in response to receiving the connection request from the participant telecommunication device:
determine a current agenda item being discussed;
if the current agenda item being discussed is not the first agenda item, prevent communication exchange with the teleconference for the participant telecommunication device; and
if the current agenda item being discussed is the first agenda item, connect the participant telecommunication device to the teleconference and restrict contribution from the participating device.

12. The computer program product of claim 11, wherein the plurality of instructions further comprises instructions which when executed allows the machine to:

receiving a selection of a third agenda item;
determining that a second agenda item is being discussed;
in response to determining that the second agenda item is being discussed, terminate the connection to the teleconference of the participant telecommunication device; and
in response to later determining that the third agenda item is being discussed, establish the connection with the teleconference to the participant telecommunication device.

13. The computer program product of claim 11, wherein the plurality of instructions further comprises instructions which when executed allows the machine to:

receive a request of a moderator telecommunication device, wherein the request authorizes a selection of participant telecommunication devices that are permitted to exchange communication to the teleconference; and
in response to receiving the request, mute participant telecommunication device that are not of the selected participant telecommunication devices.

14. The computer program product of claim 11, wherein the plurality of instructions further comprises instructions which when executed allows the machine to:

in response to the teleconference terminating prior to each agenda item of the plurality of agenda items being discussed, select a next time for a follow-up teleconference;
create a follow-up pass code for each authorized participant of the plurality of participants authorized to speak on one or more of the remaining agenda items; and
transmit the follow-up pass code to each of the authorized participants.

15. The computer program product of claim 11, wherein the plurality of instructions further comprises instructions which when executed allows the machine to:

in response to determining the maximum time limit for the current agenda item being discussed has expired, prevent communication exchange with the teleconference for the participant telecommunication device.

* * * * *